US012075762B2

(12) United States Patent
Lacourt et al.

(10) Patent No.: US 12,075,762 B2
(45) Date of Patent: Sep. 3, 2024

(54) BEE POLLINATION MONITORING SYSTEM

(71) Applicant: Ubees France, Paris (FR)

(72) Inventors: Arnaud Lacourt, New York City, NY (US); Lucile Dauger, Le Chesnay (FR); Maximilian Ebrard, Meudon-sur-Seine (FR)

(73) Assignee: UBEES FRANCE, Paris (FR)

(*) Notice: Subject to any disclaimer, the term of this patent is extended or adjusted under 35 U.S.C. 154(b) by 0 days.

(21) Appl. No.: 17/157,513

(22) Filed: Jan. 25, 2021

(65) Prior Publication Data

US 2022/0232808 A1 Jul. 28, 2022

(51) Int. Cl.
*A01K 55/00* (2006.01)
*H04Q 9/02* (2006.01)

(52) U.S. Cl.
CPC ............. *A01K 55/00* (2013.01); *H04Q 9/02* (2013.01); *H04Q 2209/43* (2013.01)

(58) Field of Classification Search
CPC ....... A01K 55/00; H04Q 9/00; H04Q 2209/43
See application file for complete search history.

(56) References Cited

U.S. PATENT DOCUMENTS

| 6,475,061 | B1 |  | 11/2002 | Huang |  |
|---|---|---|---|---|---|
| 2012/0202403 | A1 | * | 8/2012 | Sinanis | A01K 51/00 449/2 |
| 2013/0273808 | A1 |  | 10/2013 | Al Khazim Al Ghamdi |  |
| 2015/0084784 | A1 | * | 3/2015 | Suta | G08C 17/02 340/870.01 |
| 2016/0104806 | A1 | * | 4/2016 | Thrush | G01N 21/15 257/434 |
| 2016/0212976 | A1 | * | 7/2016 | Bulanyy | A01K 47/06 |
| 2017/0064931 | A1 | * | 3/2017 | Tagliaferri | A01K 47/04 |
| 2017/0360010 | A1 | * | 12/2017 | Wilson-Rich | H04Q 9/02 |
| 2019/0014803 | A1 | * | 1/2019 | Liu | A23L 21/25 |
| 2019/0364853 | A1 | * | 12/2019 | Voisin | A01K 47/06 |
| 2020/0315143 | A1 | * | 10/2020 | Radzyner | A01K 51/00 |

(Continued)

FOREIGN PATENT DOCUMENTS

| DE | 202006011655 | 9/2006 |
|---|---|---|
| EP | 2915424 | 9/2015 |

(Continued)

OTHER PUBLICATIONS

International Preliminary Report on Patentability for PCT/EP2022/050795, issued Jul. 20, 2023.

*Primary Examiner* — Amine Benlagsir
(74) *Attorney, Agent, or Firm* — DUANE MORRIS LLP; Gregory M. Lefkowitz; Brandon A. Chan

(57) ABSTRACT

The invention relates to an electronic device for monitoring a beehive, the beehive comprising a plurality of frames on which bees build their comb, the electronic device comprising a plurality of temperature sensors and a communication module, wherein: the electronic device is adapted to be placed on top of the frames, between said frames and an inner cover or a lid of the beehive, and, each temperature sensor is coupled to a thermal diffuser, each thermal diffuser being adapted to cover one of the gaps between two adjacent frames when the electronic device is placed on top of the frames, and, the communication module is adapted to send a message comprising at least one measure from the temperature sensors.

16 Claims, 6 Drawing Sheets

(56) References Cited

U.S. PATENT DOCUMENTS

| | | | |
|---|---|---|---|
| 2020/0334443 A1* | 10/2020 | Symes | A01K 47/06 |
| 2021/0016313 A1* | 1/2021 | Jenkins | B05C 3/005 |
| 2021/0109691 A1* | 4/2021 | Yamakawa | G06F 3/1236 |
| 2022/0125029 A1* | 4/2022 | Chapa | A01N 1/0221 |

FOREIGN PATENT DOCUMENTS

| | | |
|---|---|---|
| FR | 2854766 | 11/2004 |
| IT | 201800003545 | 9/2019 |

* cited by examiner

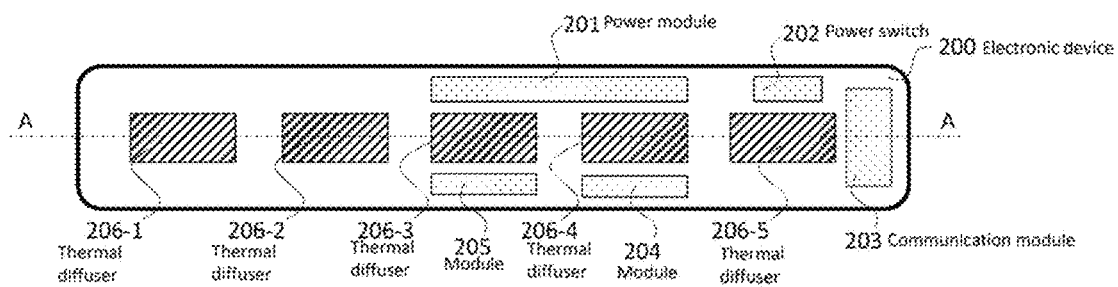
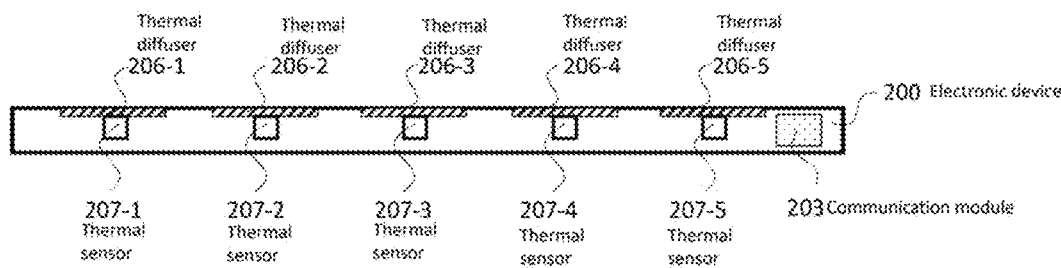
FIG. 2
FIG. 3

BEE POLLINATION MONITORING SYSTEM

TECHNICAL FIELD OF THE INVENTION

The present invention relates to the field of beekeeping, and more precisely to an electronic device and a system for monitoring one or more beehives.

Figure 1:
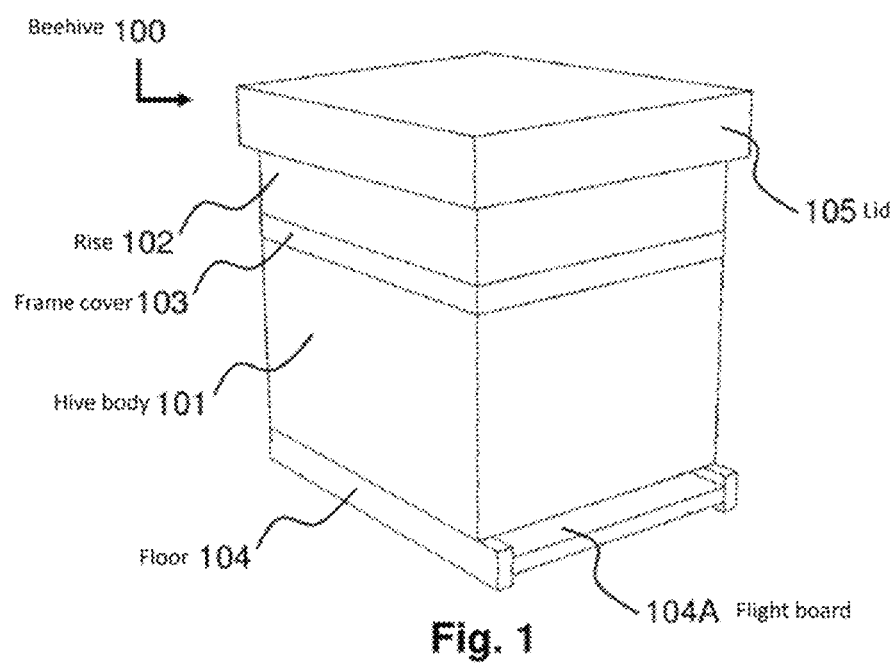

An example of a beehive 100 is illustrated in FIG. 1. Such a beehive 100 typically corresponds to a model of beehive called "Langstroth". The beehive 100 comprises a first part 101 called the "hive body" (or "body"). Beehive 100 may include, mainly in spring and summer, at least a second part 102 called "rise", said second part 102 being placed on top of the first part 101. The lower part 101 or hive body may comprise one or two boxes, usually of standardized dimensions, and stacked one on top of the other. A box of standard dimension is called a "deep". A box with a height equal to half the height of a standard box (i.e. a "deep") is called a "shallow", the length and width of a "shallow" being identical to that of a "deep". Three main configurations of hive body 101 are commonly found: "double-deep" (two "deep" boxes being stacked one on top of the other), "deep and shallow" (a "shallow" box being stacked on top of a "deep" box) and "single-deep" (a "deep" box alone). Similarly, a rise 102 may comprise one or several "deep(s)" and/or "shallow(s)".

Possibly, a frame cover 103 is placed between the hive body 101 and the rise 102. Possibly, several rises similar to the rise 102 can be stacked on top of the hive body 101. Beehive 100 has a lid 105. Possibly, an inner cover (not illustrated) is inserted between an upper part of the beehive and the lid 105. The beehive 100 includes a floor 104 on which the body 101 rests. The floor 104 includes an extension 104A called the "flight board" at the entrance of the hive, which is located in the lower area of body 101. The flight board 104A allows the bees to land before entering the beehive 100 or flying away.

The boxes, either "deep" or "shallow", constituting the body 101 and, if any, the rise 102 of the beehive 100 are hollow elements that can accommodate vertically removable frames suspended inside. These frames allow the bees to build their honeycombs. A box, "deep" or "shallow", can accommodate a same predefined number of frames, usually 8 or 10 frames. A queen bee colony is usually located in a frame of the body 101. Unlike the body 101, a rise 102 is not intended to accommodate a queen. In other words, the body 101 of the hive 100 corresponds to the zone of life of the bees, whereas the rise 102 corresponds to the zone exploited by a beekeeper, i.e. the zone used for the harvest of honey.

The French patent n°0305784 delivered on Aug. 4, 2006 discloses a device allowing a remote monitoring of a beehive, the device taking the form of a removable base on which the beehive to be monitored can be placed. The base typically includes a weight sensor and communication means allowing to remotely monitor the evolution of the weight of the beehive placed on it. The base may include other sensors, such as a temperature, humidity, or atmospheric pressure sensor. The solution presented in the above-mentioned patent has various disadvantages. First, the disclosed solution allows only the monitoring of the total weight of the beehive. Then, the disclosed solution only allows monitoring of parameters outside the beehive and does not allow in any way to monitor what is happening inside the beehive. It is therefore necessary to propose a solution to overcome these various disadvantages.

SUMMARY OF THE INVENTION

The present invention relates to a bee pollination monitoring system. The invention relates to an electronic device for monitoring a beehive, the beehive being adapted to comprise a plurality of frames on which bees can build their comb, the electronic device comprising a plurality of temperature sensors and a communication module, wherein:
the electronic device is adapted to be placed on top of the frames, between said frames and an inner cover or a lid of the beehive, and,
each temperature sensor is coupled to a thermal diffuser, each thermal diffuser being adapted to cover one of the gaps between two adjacent frames when the electronic device is placed on top of the frames, and,
the communication module is adapted to send a message comprising at least one measure from the temperature sensors.

Advantageously, when the electronic device is placed inside a beehive, on top of the frames, the thermal diffuser can cover the gaps between two frames. Thus, each temperature sensor, coupled to a thermal diffuser, can measure a temperature linked to the bees' activity located between two frames, said temperature being a good indicator of the bees population. The thermal diffuser gives flexibility to the measurements by enabling them even if the very sensor is not right above a gap. The measures can be sent to a remote device, possibly upon request, through the communication module. Also, the size of the electronic device does not prevent the circulation of bees in the beehive, nor alter the proper functioning of their activity within it.

According to a complementary embodiment, the beehive being adapted to comprise "N" frames on which bees build their comb, the electronic device comprises "N/2" temperature sensors, each thermal diffuser being adapted to cover one out of two of the gaps between two adjacent frames when the electronic device is placed on top of the frames.

Advantageously, one out of two gaps between the frames temperature is monitored. Thus, the electronic device architecture is simplified, the size of the electronic device can be limited while still allowing the use of thermal diffuser big enough to cover the gaps even if the electronic device is not precisely placed over the frames.

According to a complementary embodiment, the electronic device is adapted to be placed perpendicularly on top of the frames, each thermal diffuser extending over a length corresponding to the width of a frame and of the gap between two frames and being centered above a gap when the electronic device is placed on top of the frames According to a complementary embodiment, the electronic device comprising a printed circuit board comprising a copper layer recovered by a varnish layer, each thermal diffuser comprises a sensing surface being obtained by:
removing the varnish layer over the sensing surface,
perforating dotted holes around the sensing surface,
the temperature sensor being fixed on the sensing surface.

According to a complementary embodiment, the electronic device comprises a humidity sensor, the communication module being adapted to send a message comprising at least one measure from the humidity sensor.

According to a complementary embodiment, the electronic device comprises an accelerometer, the communication module being adapted to send a message when an acceleration is detected by the accelerometer.

According to a complementary embodiment, the thickness of the electronic device is less than a height of a void space above the frames.

According to a complementary embodiment, the thickness of the electronic device is around 3 mm.

According to a complementary embodiment, the electronic device comprises an outer protection integrating the plurality of thermal diffusers.

According to a complementary embodiment, the beehive being adapted to comprise "N" frames on which bees build their comb, the electronic device is a bar:
- the thickness of the bar being less than the height of the space between the top of the frames and an inner cover or a lid of the beehive,
- the length of the bar corresponding to "N" widths of a frame and "N−1" widths of a gap between two frames.

According to a complementary embodiment, the communication module is a Bluetooth Low Energy communication module.

The invention also relates to a system for monitoring at least one beehive, the system comprising:
- at least one electronic device as described hereafter,
- a concentrator, the concentrator comprising a first communication module adapted to communicate with at least a communication module of the at least one electronic device and receive data from said electronic device.

According to a complementary embodiment, the concentrator comprising a second communication module, the second communication module is adapted to send a message comprising at least data received from the at least one electronic device.

According to a complementary embodiment, the concentrator is adapted to send a message via the second communication module when a connection via the first communication module to an electronic device is lost.

According to a complementary embodiment, the concentrator comprising an accelerometer and a geolocation module, the second communication module is adapted to send a message when an acceleration is detected by the accelerometer, the message comprising a location determined by the geolocation module.

FIGURES

Figure 4:
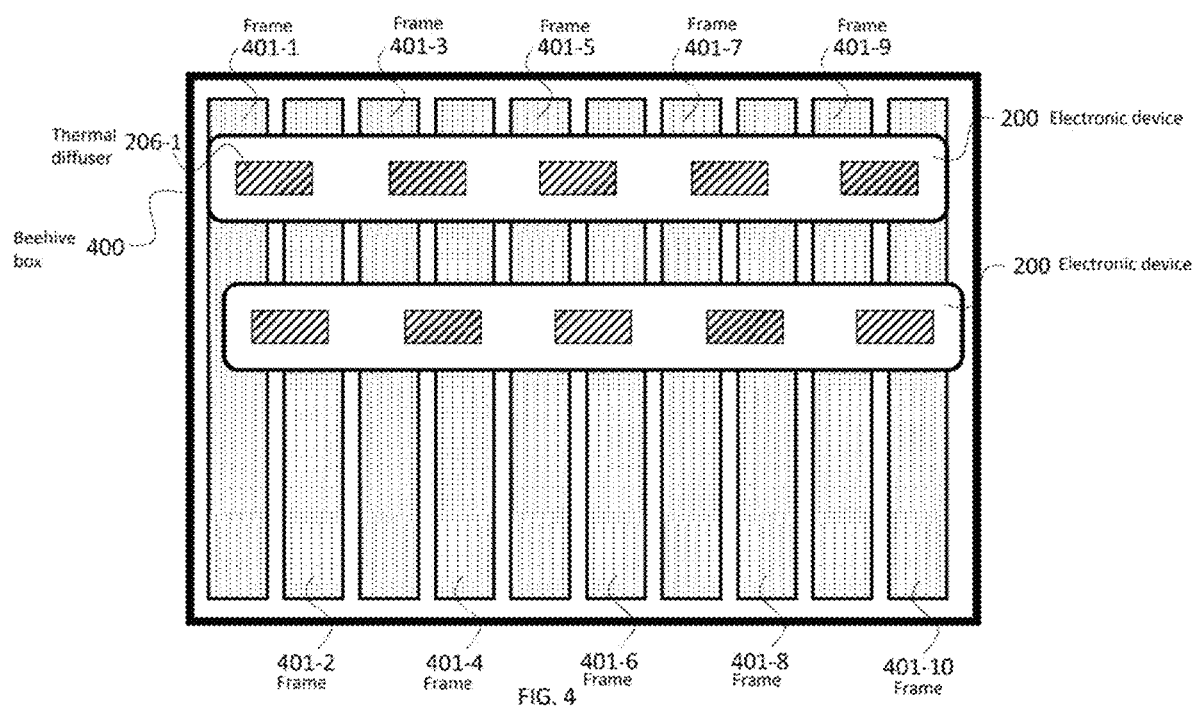
Figure 5:
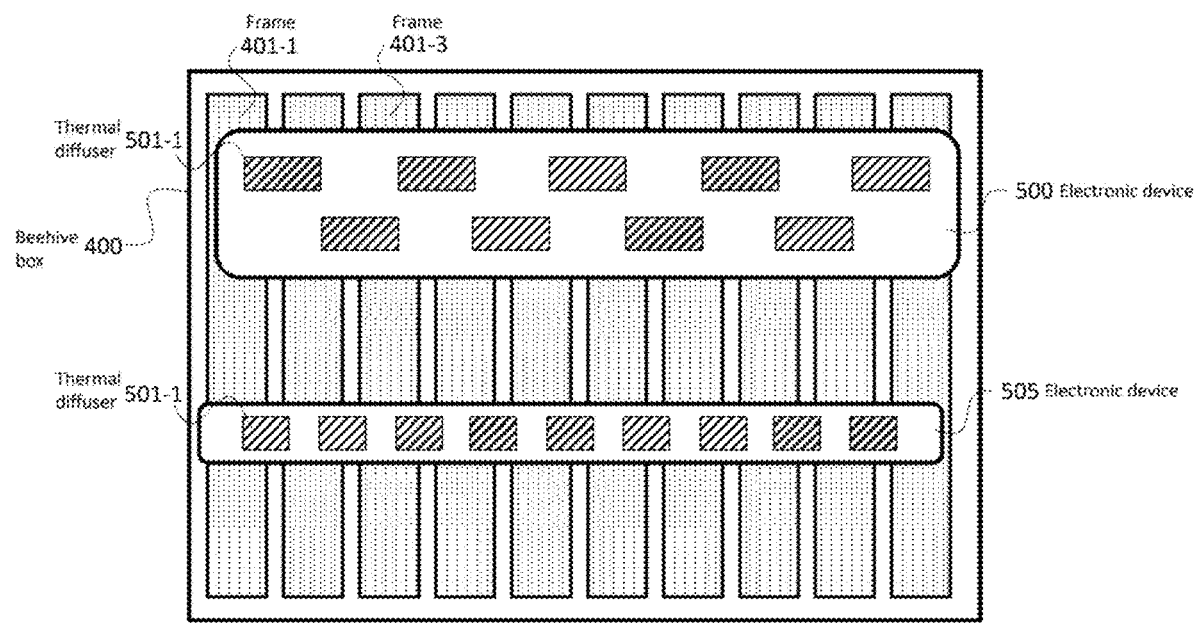

Characteristics of the invention mentioned above, as well as others, will appear more clearly when reading the following description of examples of embodiments, said description being made in relation to the attached figures, among which:

FIG. 1 shows a typical diagram of a beehive of the type called "Langstroth",

FIG. 2 shows a top view of an electronic device for monitoring a beehive according to one embodiment of the invention, FIG. 3 shows a section, according to axis AA, of the electronic device for monitoring a beehive, FIG. 4 shows a top view of a plurality of frames inside a beehive box with two electronic devices for monitoring the beehive placed on top of them, FIG. 5 shows a top view of a plurality of frames inside a beehive box with two electronic devices for monitoring the beehive according to other embodiments of the invention placed on top of them.

Figure 6:
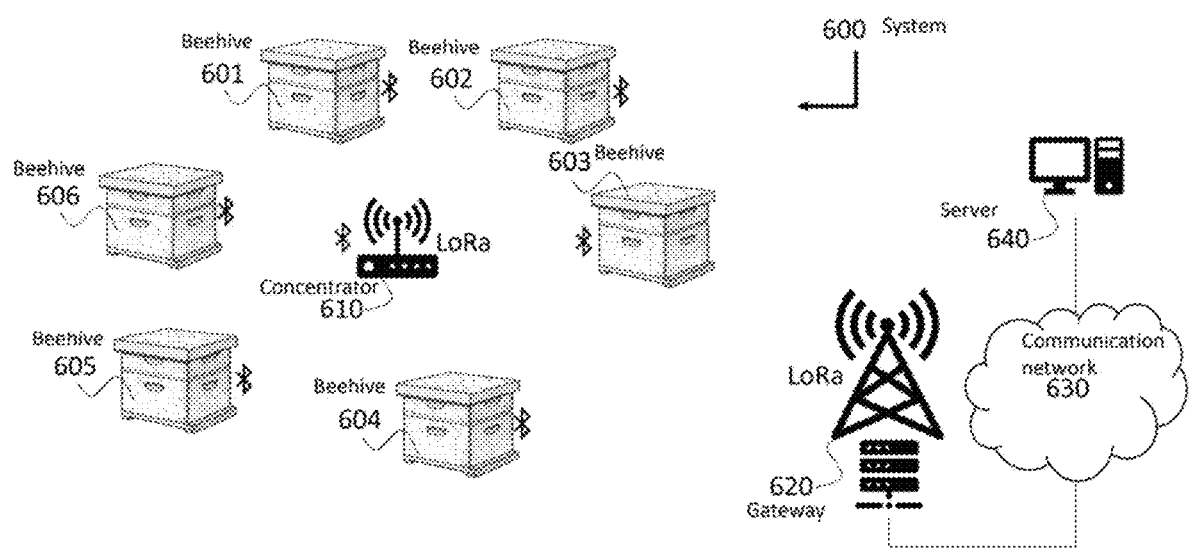
Figure 7:
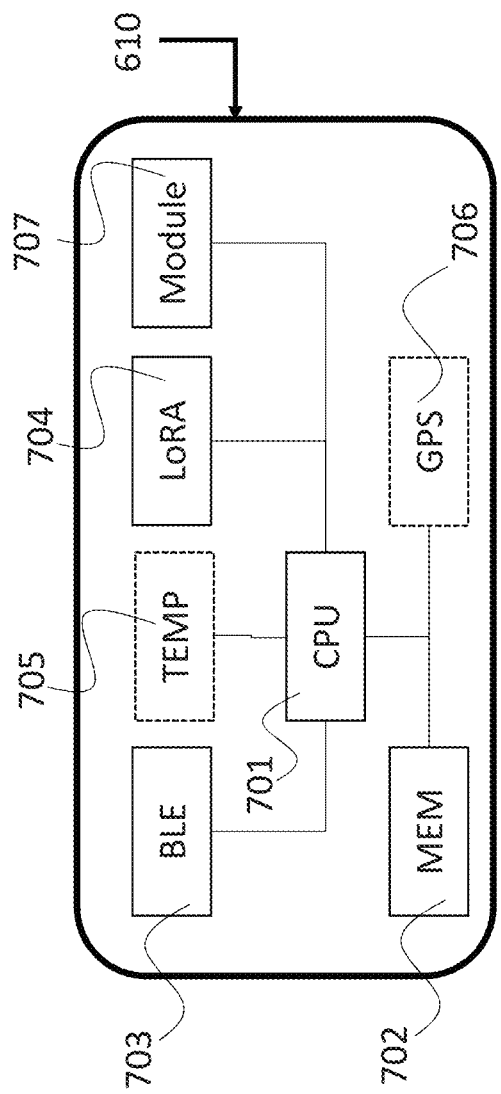

FIG. 6 shows a system for monitoring a plurality of beehives according to one embodiment of the invention, and, FIG. 7 shows an exemplary embodiment of a concentrator according to an embodiment of the invention.

DETAILED DESCRIPTION OF THE INVENTION

The invention is based on temperatures measured at different points of a sensor device placed inside a beehive. Indeed, the thermo-regulatory capacity of the beehive is a good indicator of the health and quantities of the bees.

Indeed, beehive temperature is key to the bees. Bees maintain the temperature of the beehive around 35° C. so that brood can develop normally. When the temperature in the beehive is too high the bees ventilate by fanning the hot air out of the beehive or use evaporative cooling mechanisms. When the temperature is too low bees generate metabolic heat by contracting and relaxing their flight muscles. It has been shown that even small deviations (more than 0.5° C.) from the optimal beehive temperatures have significant influence on the development of the bees. The invention permits to measure a precise temperature over a gap between two frames where the bees actually work.

FIG. 1 shows a typical diagram of a beehive 100 of the type called "Langstroth". FIG. 1 has been previously described.

FIG. 2 shows a top view of a sensor device or electronic device 200 for monitoring a beehive 100 according to one embodiment of the invention. In this embodiment, the electronic device 200 comprises a power module 201, a power switch 202, a communication module 203 and a plurality of temperature sensors (not shown here) comprising or coupled to thermal diffusers 206-1 to 206-5. The thermal diffuser 206-X may comprise copper. The effect of coupling a thermal diffuser to a temperature sensor is to allow the thermal sensor to measure a temperature on a wider surface. The power module 201 can be a battery or any other source of electricity. The communication module 203 can be a radio module, possibly a Bluetooth or Bluetooth Low Energy module (hereafter BLE module). The communication module 203 is adapted to send a message comprising at least one measure from the temperature sensor or any other sensor of the electronic device 200. The electronic device 200 may comprise a memory (not shown) to store the measures from the sensors and transmit on request (upon receiving a message with the communication module 203) said measures via the communication module 203.

According to one embodiment of the invention, communication module 203 is adapted to send broadcast messages. For example, communication module 2013 can be a BLE module and adapted to send advertising messages. Thus, no prior establishment of connection with a receiving device is needed. In other words, by sending advertising messages, no prior pairing step to any device is required. Moreover, it helps improving power savings. Each electronic device 200 may send an advertising message comprising at least one measure from the temperature sensor, or any other sensor of the electronic device 200, periodically, for example every 10 seconds. By sending advertising messages, there is no need to synchronize any receiving device, the receiving device may listen for advertising messages for example continuously or only periodically, for example every hour, during a time windows of at least the period of emission of an electronic device 200, for example 15 seconds.

The electronic device 200 may comprise other modules (here illustrated with modules 204 and 205), such as for example a humidity sensor, an accelerometer or a microphone. The humidity sensor can be a hygrometer. The humidity sensor can be adapted to measure a humidity level in the air around the electronic device 200. The humidity sensor can be integrated within a temperature sensor 206-X. Said otherwise, a sensor 206-X can integrate various types of sensors such as, for example, a temperature sensor and a humidity sensor. Thus, according to an embodiment of the invention, the sensor 206-3 comprises a temperature sensor and a humidity sensor. The electronic device 200 may be adapted to emit a message via the communication module 203 when the accelerometer detects a movement or acceleration of the electronic device 200, possibly indicating that the beehive is being displaced or stolen. A microphone sensor may be adapted to capture live audio and stream it via the communication module 203, possibly upon request. The electronic device 200 may be adapted to detect when the power of an audio signal captured by the microphone exceeds a predetermined value, the electronic device 200 being then adapted to send an alert message via the communication module 203 or possibly to switch to a live mode, where the audio captured by the microphone is streamed via the communication module 203.

Globally, measures from the different sensors (temperature, humidity, microphone, etc.) may be made periodically (for example every fifteen seconds). The periods for the measures may depend on the sensor type, or even on the sensor itself. Alternatively, or in a complementary way, a measure may be triggered by a message received by the communication module 203 ("measure upon request").

Measures from a sensor may be sent via the communication module 203 in real time, or may be stored, for example within the sensor itself or in the memory of the electronic device 200, to be sent in a grouped way, either periodically (for example every hour) or upon request. Measures from different sensors may be grouped within one or several messages to be sent.

The electronic device 200 can take the form of a bar and be protected by an external layer or outer protection against for example humidity, liquid, dust, or possibly honey or beeswax. In this case, the thermal diffusers 206-X are flush with the surface of the electronic device 200. The material used for the external layer of protection shall be chosen so as not to harm—physically or chemically—the bees. For example, the external layer can be made of wood, silicon, technical fabric or technical textile.

According to one embodiment of the invention, the electronic device 200 must not alter the beehive physically or chemically and/or must have a size small enough to allow it to fit into the beehive without requiring a modification of the structure of the beehive, such as for example a clearance between edges of a box and a lid or an inner cover.

According to one embodiment of the invention, the electronic device 200 comprises a printed circuit board (PCB hereafter). The PCB may support and connect the different sensors and/or modules of the electronic device 200. The thermal diffuser 206-X may be constituted by an external copper layer of the PCB forming a sensing surface. Perforations in the PCB around each sensing surface or thermal diffuser may insure a thermal insulation.

According to one embodiment of the invention, a PCB comprises two conductive layers comprising in between a central dielectric layer, each conductive layer being recovered by an external protective varnish. The central layer may comprise a resin layer such as a FR-4 substrate (FR for flame retardant as defined by the National Electrical Manufacturers Association). A conductive layer may comprise a metal, for example copper. Total thickness of the PCB may be around 1.2 millimeter. Thermal diffuser 206-X may be designed by:

removing the external protective varnish recovering a predefined area (or "sensing surface"), leaving the conductive layer, for example copper plate, naked, the sensing area may be rectangular, fixing, by example by welding, a temperature sensor to the surface of the conductive layer, on the sensing area, the sensor being located below the sensor device, that is to say in contact with the conductive layer, for example the copper plate, drilling or perforating a plurality of dotted holes around the predefined area, in order to establish a heat insulation between the sensing surface and the rest of the PCB, air being a much better insulator than for example copper.

The length of the sensing surface can be chosen to cover at least one interframe space, that is to say at least one gap between two successive frames. Thus, when the electronic device 200 is placed inside a beehive on top of the frames, even if the temperature sensor is located over a frame, a significant part of the sensing surface is facing the gap formed with the adjacent frame. Thermal diffusion over the thermal diffuser allows measurement of heat emission generated by the bees within the interframes or gap between two frames.

Thus, advantageously, thermal diffusers are made directly from the PCB used to make the electronic device 200, which facilitates the making of the electronic device 200 and reduces complexity of the device.

FIG. 3 shows a section, according to axis AA on FIG. 2, of the electronic device 200 for monitoring a beehive 100. In this FIG. 3, the thermal sensors 207-1 to 207-5 are visible, each thermal sensor 207-X being coupled to a thermal diffusers 206-X. The communication module 203 is also represented, here protected inside the electronic device 200 by the external layer.

In a beehive such as beehive 100, Burr comb, brace comb and bridge comb can be avoided or minimized by keeping the dimension of all internal spaces inside the hive to the "bee space" limit of ¼ to ⅜ inch (that is to say 6.4 to 9.5 mm). Therefore, to be able to insert the electronic device 200 inside a beehive 100 using a free internal space, the thickness of the electronic device 200 shall be around 3 millimeters, for example 3.2 millimeters. As explained hereafter, thickness of the electronic device 200 can be adapted according to the available space over the frames. Possibly, a wedge system, for example removable external covers of different thickness, allows the thickness of the electronic device 200 to be adapted to the available space inside the beehive 100. More generally, the thickness of the electronic device 200 shall not prevent the beehive to be closed normally when placed over the frames. The electronic device 200 is thus adapted to be placed on top of the frames, between said frames and a possible inner cover or lid of the beehive. Said otherwise, the thickness of the electronic device 200 is less than the height of a void space above the frames.

FIG. 4 shows a top view of a plurality of frames 401-1 to 401-10 inside a beehive box 400 with two electronic devices 200A and 200B, for monitoring the beehive, placed on top of the plurality of frames 401-X. The beehive box 400 may be the body 101 or the rise 102, and can be a "deep" or a "shallow". The electronic device 200A and 200B are similar to the electronic device 200. Electronic device 200A and 200B are here shown upside down, in order to show the location of the thermal diffusers 206-X relatively to the gaps between the frames 401-1 to 401-10. When in use, the electronic devices 200A and 200B shall be placed with the thermal diffusers 206-X facing down, towards the frames 401-X. According to one embodiment of the invention, each thermal diffuser 206-X covers both sides of the electronic device 200 so that the electronic device 200 can be used in any position, "recto or verso", i.e. facing up or down.

As illustrated in FIG. 4, each thermal diffuser 206-X is adapted to cover one of the gaps between two adjacent frames 401-X when the electronic device 200A or 200B is placed on top of the frames 401-X. The dimension of a thermal diffuser 206-X, particularly along the AA axis (that is to say the axis perpendicular to the frames), is such that a thermal diffuser 206-X can cover a gap between two adjacent frames even if the electronic device 200 is not precisely placed over the frames 401-X. In FIG. 4, even if electronic device 200B is represented slightly off centered, the dimension of each thermal diffuser 206-X allows to cover each gap between the frames 401-X. The dimension of each thermal sensor 206-X along the AA axis (i.e. the length of the sensing surface) can be equal to the width of a frame. According to one embodiment of the invention, dimension of each thermal sensor 206-X along the AA axis may be chosen equal to the thickness of a frame plus the thickness of an interframe space. The dimension of each thermal sensor 206-X along the AA axis may be 38 millimeters, or around 38 millimeter (not including insulation perforation) or 41 millimeters (including insulation perforations). Thermal diffusers may be separated from each other by 29 millimeters.

Possibly, each thermal diffuser 206-X extends over a length corresponding to the width of a frame 401-X and of the gap between two frames 401-X and is centered above the gap when the electronic device 200 is placed on top of the frames 401-X.

An electronic device 200 may comprise a system to facilitate the positioning of the electronic device 200 over the frames 401-X. The electronic device 200 may comprise small protrusions to be inserted in the gap between the frames. Such protrusions may be removable or moveable.

The length (along the axis AA) of the electronic device 200 is adapted to the dimension of the beehive box 400, so the electronic device 200 can be inserted inside the beehive box 400 and placed perpendicularly over the frames 401-X.

According to one embodiment of the invention, the electronic device 200 takes the form of a bar, the length of the bar corresponding to "N" widths of a frame and "N−1" widths of a gap between two successive frames, the beehive being adapted to receive N frames. The thickness of said bar is less than the height of the space between the top of the frames and an inner cover or a lid of the beehive.

As shown hereafter in FIG. 5, the electronic device may comprise one thermal diffuser, that is to say one thermal sensor, for each gap between two frames.

In FIG. 4, the beehive comprises 10 frames on which bees build their comb. The electronic device 200A and 200B comprises 5 temperature sensors, each thermal diffuser being adapted to cover one out of two of the gaps between two adjacent frames when the electronic device 200A or 200B is placed on top of the frames.

More generally, when a beehive is adapted to comprise "N" frames on which bees build their comb, an electronic device 200 may comprise "N/2" temperature sensors, each thermal diffuser being adapted to cover one out of two of the gaps between two adjacent frames when the electronic device is placed on top of the frames. Thus, each frame can be monitored, from one of its two sides, meanwhile the number of thermal diffusers is limited. This allows to reduce the complexity, weight, and cost of the electronic device 200.

FIG. 5 shows a top view of a plurality of frames 401-X inside the beehive box 400 with two electronic devices 500 and 505 for monitoring the beehive 100 according to other embodiments of the invention placed on top of the frames.

Each electronic device 500 and 505 comprises as much thermal diffusers 501-X as there are gaps between the frames 401-X.

The thermal diffusers may be placed on a same line, as on the electronic device 505, or can be placed alternatively on two lines as on electronic device 500. Alternative placing allows for longer thermal diffusers.

FIG. 6 shows a system 600 for monitoring a plurality of beehives 601, 602, 603, 604, 605 and 606 according to one embodiment of the invention. Each beehive 601, 602, 603, 604, 605 and 606 comprises at least electronic device 200 placed on top of its frames inside the body and/or the rise. Each electronic device of each beehive 601, 602, 603, 604, 605 and 606 is connected, for example via its Bluetooth Low Energy communication module, to a concentrator 610 (the concentrator 610 is then a receiving device for each electronic device 200).

Possibly, each electronic device may need to be paired with the concentrator 610. The concentrator 610 is adapted to receive messages from the different electronic devices 200 at proximity, possibly store said messages, and retransmit said messages via a long-distance communication module, for example a LoRa ("Long Range" communication network, or low-power wide-area network) communication module, to a Gateway 620. The gateway 620 may retransmit said messages to a server 640 via Internet or any communication network 630 (such as a 3G/4G/LTE/5G network). The server 640 may consolidate the data received from several groups of beehives before retransmission.

According to one embodiment of the invention, each electronic device of each beehive 601, 602, 603, 604, 605 and 606 is adapted to emit (or broadcast) messages, independently of the presence of a concentrator 610. In other words, according to this embodiment, no prior connection (or pairing) between an electronic device and a concentrator is needed. If present, a concentrator 610 may receive the sent messages. The received messages may be stored and/or retransferred to a Gateway 620.

Thus, possibly, each electronic device 200 sends advertising (or broadcast) messages so no pairing with the concentrator 610 is needed. Each electronic device 200 may send a message comprising measurements periodically, for example every 10 seconds. The concentrator 610 may listen continuously or the concentrator may listen periodically during a time window, the time windows being greater than the emission period of an electronic device. The concentrator 610 may listen for example every hour during a time window of 15 seconds.

The concentrator 610 may comprise a temperature sensor and/or a geolocation module such as a GPS module (Global Positioning System). The concentrator may comprise an accelerometer and/or a humidity sensor. The concentrator may transmit, for example periodically, to the server 640, via the gateway 620, an external temperature around the group of beehives 601, 602, 603, 604, 605 and 606 or the location of the groups of beehives. The concentrator may comprise an identification code that is possibly added to the messages emitted by the concentrator 610. GPS module can be used for time synchronization of the concentrator 610. GPS module and accelerometer module can be used to send an alert message when a movement is detected, the alert message comprising a GPS determined location. Thus, messages with the location of the concentrator 610, determined with the GPS module, may be sent every time a movement of the concentrator 610 is detected, that is to say, each time the accelerometer is triggered.

Similarly, each electronic device 200 may also comprise an identification code. Such identification code may correspond to, or comprise, a media access code (MAC address) associated to the communication module 203 of each electronic device 200. The identification code of an electronic device 200 may be associated to a beehive and/or beekeeper.

The concentrator 610 may comprise a humidity module. Said humidity module is advantageously outside the concentrator 610, allowing the concentrator 610 to be inside a sealed box. Humidity module, or any other module of the concentrator 610, may be external and communicate with the concentrator 610 via the BLE module, with or without prior pairing.

The concentrator may be adapted to retransmit a message sent by an electronic device 200 inside a beehive when said electronic device detects a movement of the beehive. The concentrator may be adapted to send an alert message when a connection to an electronic device 200 is lost, possibly indicating a movement of the beehive outside the reach of the first communication module (when said communication module is a radio communication module, for example a Bluetooth module). Each message may comprise the identification code of said electronic device 200 and/or concentrator 610.

The concentrator 610 may store the messages received from the electronic device 200 and possibly send them after a consolidation of different messages, from the same electronic device or from different electronic devices, or immediately. According to one embodiment of the invention, the concentrator 610 is adapted to store messages received from a plurality of electronic devices 200 during a predetermined period. The predetermined period may correspond to a pollination season, that is to say for example 3 months. Thus, the concentrator 610 may be adapted to store the equivalent of messages sent by 20, possibly 48, electronic devices 200 during a period of 3 months. Said messages may be stored, retransmitted to a server 640, possibly grouped, or both. The concentrator may filter or parse the data received from the electronic devices 200 prior to the retransmission via the LoRa module to the server 640.

The different data received by the server 640 may be consolidated and/or used for remotely monitoring the beehives from one or several beekeepers. The different date may be used as an input for an algorithm to determine an average number of frames of bees (or "FOB" for "Frames of Bees") in each beehive monitored.

FIG. 7 shows an exemplary embodiment of a concentrator 610 according to an embodiment of the invention.

The concentrator 610 comprises a processor CPU 701, a memory MEM 702, a first communication module BLE 703, a second communication module LoRa 704, possibly a temperature sensor 705 and a geolocation module GPS 706. The concentrator 610 may comprise a plurality of other modules such as module 707. Module 707 may be an accelerometer, a humidity sensor, a barometer or any other type of sensor.

The concentrator 610 may be adapted to collect weather data from a plurality of modules such as for example the temperature sensor 705, a humidity sensor, a barometer, or any other type of sensor, to define a local weather and/or local weather forecast.

The first communication module BLE 703 is possibly a Bluetooth or Bluetooth Low Energy module. The first communication module 703 is compatible with the communication module 203 of the electronic device 200. The first communication module BLE 703 may not be a Bluetooth module. The first communication module BLE 703 may be for example a "Zigbee" or "Wi-Fi" compatible module, or any other type of communication module, for example an Ethernet module. The first communication module BLE 703 may be a "low-power low-bandwidth" radio communication module.

The second communication module LoRa 704 is possibly a LoRa communication module. The second communication module 704 is compatible with a communication module of the gateway 620. The second communication module LoRa 704 may not be a LoRa module. The second communication module LoRa 704 may be of any type, for example a radio communication module such as 3G/4G/5G radio mobile communication module or Wi-Fi module, or even a fixed communication module such as an Ethernet module.

The memory MEM 702 may allow data received from the electronic device 200 placed in the beehives to be stored and protected even in case of power failure of the concentrator 620. Memory MEM 702 may be a flash memory.

This description is based on the use of beehives with mobile frames of the "Langstroth" type. The man skilled in the art knows how to adapt the present teaching to a model of beehive of the type "Dadant", "Warré", "Voirnot", "Zander", "Top-bar hives" or any other type of beehive with at least one element including frames or bars. It should be noted that hives of different types can be monitored simultaneously by means of different electronic devices 200 adapted to the dimensions of each type of beehives and a same concentrator 620.

The invention can be adapted to any type of hive and is not restricted to beehive.

We claim:

1. An electronic device for monitoring a beehive, the beehive being adapted to comprise a plurality of frames on which bees can build their comb, each two adjacent frames among the plurality of frames form a gap, the electronic device comprising a plurality of temperature sensors and a communication module, wherein:
    the electronic device is to be placed on top of and external to the plurality of frames, between the plurality of frames and an inner cover or a lid of the beehive without altering activity of the bees in the beehive, and,
    each temperature sensor is coupled to a thermal diffuser of a plurality of thermal diffusers, each thermal diffuser of the plurality of thermal diffusers being adapted to cover the gap between said each two adjacent frames when the electronic device is placed on the top of the plurality frames, and said each thermal diffuser being adapted to transmit heat generated by the bees via thermal diffusion to allow said each temperature sensor to which it is coupled to measure heat emission generated by the bees within the gap between said each two adjacent frames covered by said each thermal diffuser, and,
    the communication module is adapted to send a message comprising at least one measure from the temperature sensors.

2. The electronic device according to claim 1, the beehive being adapted to comprise "N" frames of the plurality of frames on which the bees build their comb, wherein the electronic device comprises "N/2" temperature sensors of the plurality of temperature sensors if N is even and "(N−1)/2" if N is odd, said each thermal diffuser being adapted to cover the gap between said each two adjacent frames when the electronic device is placed on the top of the plurality of frames.

3. The electronic device according to claim 2, wherein the electronic device is to be placed perpendicularly on the top of the plurality of frames, said each thermal diffuser extending over a length corresponding to a width of each frame of the plurality of frames and of the gap between said each two frames and being centered above the gap when the electronic device is placed on the top of the plurality of frames.

4. The electronic device according to claim 1, said each thermal diffuser comprising copper.

5. The electronic device according to claim 4, the electronic device comprising a printed circuit board comprising a copper layer recovered by a varnish layer, said each thermal diffuser comprising a sensing surface being obtained by:
   removing the varnish layer over the sensing surface,
   perforating dotted holes around the sensing surface, said each temperature sensor being fixed on the sensing surface.

6. The electronic device according to claim 1, the electronic device comprising a humidity sensor, the communication module being adapted to send a second message comprising at least one measure from the humidity sensor.

7. The electronic device according to claim 1, the electronic device comprising an accelerometer, the communication module being adapted to send a third message when an acceleration is detected by the accelerometer.

8. The electronic device according to claim 1, a thickness of the electronic device being less than a height of a void space above the plurality of frames.

9. The electronic device according to claim 1, a thickness of the electronic device being around 3 mm.

10. The electronic device according to claim 1, the electronic device comprising an outer protection integrating said each thermal diffuser.

11. The electronic device according to claim 1, the beehive being adapted to comprise "N" frames of the plurality of frames on which the bees build their comb, the electronic device being a bar:
   a thickness of the bar being less than a height of a space between the top of the plurality of frames and the inner cover or the lid of the beehive,
   a length of the bar corresponding to "N" widths of each frame of the plurality of frames and "N−1" widths of the gap between said each two adjacent frames.

12. The electronic device according to claim 1, the communication module being a Bluetooth Low Energy communication module.

13. A system for monitoring a first beehive, the system comprising:
   the electronic device according to claim 1,
   a concentrator, the concentrator comprising a first communication module adapted to communicate with the communication module of the electronic device and receive data from said electronic device.

14. The system for monitoring the first beehive according to claim 13, the concentrator comprising a second communication module, the second communication module being adapted to send a second message comprising the data received from the electronic device.

15. The system for monitoring the first beehive according to claim 14, the concentrator being adapted to send the second message via the second communication module when a connection via the first communication module to the electronic device is lost.

16. The system for monitoring the first beehive according to claim 13, the concentrator comprising a second communication module, an accelerometer and a geolocation module, the second communication module being adapted to send a first message when an acceleration is detected by the accelerometer, the first message sent when the acceleration is detected comprising a location determined by the geolocation module.

* * * * *